United States Patent
Ruiz et al.

(10) Patent No.: US 10,174,840 B2
(45) Date of Patent: Jan. 8, 2019

(54) BRAKE PISTONS AND PISTON NOSES

(71) Applicant: CWD, LLC, Carson, CA (US)

(72) Inventors: Stephen John Ruiz, Redondo Beach, CA (US); Sandor Bota, El Segundo, CA (US)

(73) Assignee: CWD, LLC, Carson, CA (US)

( * ) Notice: Subject to any disclaimer, the term of this patent is extended or adjusted under 35 U.S.C. 154(b) by 447 days.

(21) Appl. No.: 14/301,971

(22) Filed: Jun. 11, 2014

(65) Prior Publication Data

US 2014/0290477 A1  Oct. 2, 2014

Related U.S. Application Data

(63) Continuation of application No. 13/349,671, filed on Jan. 13, 2012, now Pat. No. 8,776,956.

(60) Provisional application No. 61/433,194, filed on Jan. 14, 2011.

(51) Int. Cl.
| | | |
|---|---|---|
| *F16J 1/00* | (2006.01) | |
| *F16D 65/00* | (2006.01) | |
| *F16D 65/78* | (2006.01) | |
| *F16D 125/06* | (2012.01) | |

(52) U.S. Cl.
CPC ............ *F16J 1/00* (2013.01); *F16D 65/0068* (2013.01); *F16J 1/008* (2013.01); *F16D 2065/785* (2013.01); *F16D 2125/06* (2013.01); *F16D 2200/003* (2013.01)

(58) Field of Classification Search
CPC .. F16J 1/00; F16J 1/008; F16D 65/068; F16D 2065/785; F16D 2025/06; F16D 2200/003

USPC ...... 188/370, 73.37, 73.38, 72.4, 72.7, 72.6; 92/254, 214, 208, 172, 239, 159
See application file for complete search history.

(56) References Cited

U.S. PATENT DOCUMENTS

| | | | |
|---|---|---|---|
| 1,723,823 A * | 8/1929 | Teetor | ............................ 92/159 |
| 2,888,103 A | 5/1959 | Armstrong | |
| 2,942,695 A | 6/1960 | Butler | |
| 2,989,153 A | 6/1961 | Boulet | |
| 3,085,663 A | 4/1963 | Jakeways | |
| 3,458,017 A | 7/1969 | Szymski | |
| 3,804,213 A | 4/1974 | Lucien et al. | |
| 3,915,263 A | 10/1975 | Courbot | |
| 3,951,241 A | 4/1976 | Baxendale | |
| 4,024,936 A | 5/1977 | Crabb | |

(Continued)

FOREIGN PATENT DOCUMENTS

| | | |
|---|---|---|
| EP | 0289399 A2 | 11/1988 |
| FR | 1388322 | 12/1964 |

(Continued)

OTHER PUBLICATIONS

International Search Report and Written Opinion in corresponding PCT application No. PCT/US2012/021164.

(Continued)

*Primary Examiner* — Melanie Torres Williams
(74) *Attorney, Agent, or Firm* — Joseph G. Swan, P.C.

(57) ABSTRACT

Provided are, among other things, pistons and piston noses. One representative embodiment involves a brake piston that includes a piston body and a top surface, in which the top surface is wider than the piston body and has a small portion that is slightly raised, relative to the rest of the top surface, so that when in use only the small raised portion makes contact with a backing plate of a brake pad.

24 Claims, 11 Drawing Sheets

(56) References Cited

U.S. PATENT DOCUMENTS

| | | |
|---|---|---|
| 4,085,828 A | 4/1978 | Thioux |
| 4,193,179 A | 3/1980 | Confer et al. |
| 4,527,672 A | 7/1985 | Schreiner et al. |
| 4,572,336 A | 2/1986 | Smith et al. |
| 4,583,623 A | 4/1986 | Ritsema |
| 4,605,104 A | 8/1986 | Thompson |
| 4,815,359 A | 3/1989 | Black |
| 4,953,444 A | 9/1990 | Cunningham et al. |
| 5,009,291 A | 4/1991 | Castellano |
| 5,014,827 A | 5/1991 | Wang et al. |
| 5,105,917 A | 4/1992 | Sporzynski et al. |
| 5,205,382 A | 4/1993 | Edmisten |
| 5,209,154 A | 5/1993 | Black |
| 5,538,109 A | 7/1996 | Swank |
| 5,562,186 A | 10/1996 | Osenbaugh |
| 5,660,253 A | 8/1997 | Rike |
| 6,146,727 A | 11/2000 | Dannels |
| 6,729,445 B1 | 5/2004 | Qian et al. |
| 6,811,158 B2 | 11/2004 | Heinlein et al. |
| 7,156,212 B1 | 1/2007 | Ciotti et al. |
| 7,344,006 B2 | 3/2008 | Edmisten |
| 7,353,919 B2 | 4/2008 | Christ |
| 7,367,433 B2 | 5/2008 | Bieker et al. |
| 7,383,108 B1 | 6/2008 | Curnutt |
| 7,669,699 B2 | 3/2010 | Roberts et al. |
| 2004/0094375 A1 | 5/2004 | Qian et al. |
| 2004/0195053 A1 | 10/2004 | Nowak et al. |
| 2005/0077123 A1* | 4/2005 | Malagoli et al. ............ 188/72.4 |
| 2005/0109569 A1 | 5/2005 | Sporzynski et al. |
| 2005/0194220 A1 | 9/2005 | Edmisten |
| 2007/0034459 A1* | 2/2007 | Matsushita et al. ......... 188/72.6 |
| 2007/0034462 A1 | 2/2007 | Themelin et al. |
| 2007/0039709 A1 | 2/2007 | Endo et al. |
| 2009/0120744 A1 | 5/2009 | Tristano et al. |
| 2009/0218180 A1 | 9/2009 | Roberts et al. |
| 2010/0133050 A1 | 6/2010 | Arbesman et al. |
| 2010/0170755 A1 | 7/2010 | Biggs |
| 2010/0320038 A1 | 12/2010 | Hayashi et al. |

FOREIGN PATENT DOCUMENTS

| | | |
|---|---|---|
| GB | 914375 | 1/1963 |
| GB | 1181447 | 2/1970 |
| GB | 1201314 | 8/1970 |
| GB | 1515484 | 6/1978 |
| GB | 2129511 | 5/1984 |
| JP | Y S27-00042 Y | 1/1927 |
| JP | U-S55-122543 U | 8/1980 |
| JP | 57-7239 A * | 5/1982 |
| JP | 04274952 | 9/1992 |
| JP | A-2006029442 A1 | 2/2006 |
| WO | WO 97/18403 A1 | 5/1997 |

OTHER PUBLICATIONS

Prosecution history of parent U.S. Appl. No. 13/349,671 (now U.S. Pat. No. 8,776,956).

Office Action dated Feb. 26, 2016, in corresponding Japanese Patent Application No. 2013-549554, together with English language summary of same.

Extended European Search Report dated Oct. 4, 2017, in corresponding European Patent Application No. 12734297.0.

* cited by examiner

BRAKE PISTONS AND PISTON NOSES

This application is a continuation of U.S. patent application Ser. No. 13/349,671, filed on Jan. 13, 2012, which claims the benefit of United States Provisional Patent Application Serial No. 61/433,194, filed on Jan. 14, 2011, and titled "Brake Pistons and Piston Noses". The foregoing applications are incorporated by reference herein as though set forth herein in full.

FIELD OF THE INVENTION

The present invention pertains to brake pistons and piston noses, e.g., for use in automotive disc brake systems.

BACKGROUND

In a disc brake caliper, there is direct contact between the pistons that apply the hydraulic force and the back of the pad assembly that holds the friction-producing material. That friction-producing material typically is a very good conductor of heat, and the backing-plate material often is a high-strength steel that is also very heat-conductive. The piston then becomes the conductive path to the caliper body and the hydraulic fluid in the cavity behind the piston. The hydraulic fluid has a limited temperature range in which it can operate, so it must be isolated from heat transfer that would produce temperatures above that range.

Pistons can be made from many materials, such as steel, aluminum, stainless steel, titanium or engineered compounds such as phenolics and ceramics. Preferably, the material used for the piston is the same as the material used for the caliper body, so that changes in dimensions caused by thermal expansion will affect the piston the same as the body of the caliper and, in particular, so that critical dimensions will change approximately together. Doing so maintains the relationships or tolerances between key components like the piston, piston seals, piston groove and piston bore in a narrower range. This maintenance of proper tolerances adds to caliper performance and durability.

However, the current best practice is to make pistons that are used in high-temperature environments (e.g., high-performance braking systems) from more than one material, e.g., a piston body made of aluminum (where an aluminum caliper also is being used) fitted with a nose of stainless steel, titanium or ceramic. The present disclosure concerns, among other things, the configurations of such noses to improve their performance.

Conventional piston nose designs that attempt to limit thermal conductivity exist. These conventional designs include features to reduce conductive heat transfer through material choice (e.g., stainless steel, titanium or ceramic) and/or by using structures with reduced cross section.

One conventional design, shown in FIGS. 1-3 uses a simple design involving a ceramic nose 10 attached to an aluminum piston body 12. Generally speaking, this design simply relies on choice of material (ceramic) to reduce the thermal conductivity. Another conventional design, shown in FIGS. 4-6, uses a titanium nose 20 attached to an aluminum piston body 22. However, in addition to using a low-thermal-conductivity material (titanium) for the nose 20, this design also reduces thermal conductivity by shaping the nose 20 so as to reduce contact area between the piston and the brake pad, i.e., using only an outer ring 24 as the contact surface and drilling holes 25 through the ring 24. In existing implementations of piston nose 20, ring 24 is 5 or 8 millimeters (mm) high and has holes 25 that are 3 or 5 mm in diameter, respectively.

Finally, in another conventional design (not shown), heat transfer is addressed by using a thin, typically 1 mm thick, sheet of low-thermal-conductivity material, such as stainless steel or titanium, between the piston and the high-strength steel backing of the brake pad. Unfortunately, the present inventors have discovered that the problem with this solution is that this thin sheet of low-thermal-conductivity material typically becomes distorted due to high temperatures and non-uniform force imparted by the piston nose. When that occurs, the plate is no longer flat, but instead appears wavy. In addition, the present inventors have discovered that this thin layer of metallic material exhibits a spring-like characteristic, acting like a compressible spring, and thereby requiring a longer or variable distance to be travelled by the piston before direct force is exerted on the brake pad. This delay in piston force being realized on the back of the brake pad unfavorably affects brake system performance by increasing the time required to engage the brakes and the distance the brake pedal has to travel.

SUMMARY OF THE INVENTION

The present invention addresses this problem by, among other things, using a top surface that both is wide and includes a small, slightly raised portion.

Thus, one embodiment of the invention is directed to a brake piston that includes a piston body and a top surface, in which the top surface is wider than the piston body and has a small portion that is slightly raised, relative to the rest of the top surface, so that when in use only the small raised portion makes contact with a backing plate of a brake pad.

By virtue of the foregoing arrangement, it is possible to significantly reduce the amount of thermal energy that is transferred to the brake fluid and caliper.

Another embodiment is directed to a disc brake caliper assembly that includes a caliper body having a receiving cavity and a piston inserted into the receiving cavity of the caliper body. The piston, in turn, includes: (a) a piston body; and (b) a top surface that is wider than the piston body and that has a small portion that is slightly raised, relative to the rest of the top surface, so that when in use only the small raised portion makes contact with a backing plate of a brake pad.

A still further embodiment is directed to a piston nose having a bottom side configured to attach to a top side of a piston and a top side that is substantially wider than the bottom side and that includes a top surface that has a small portion that is slightly raised relative to the rest of the top surface.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

Figure 7:
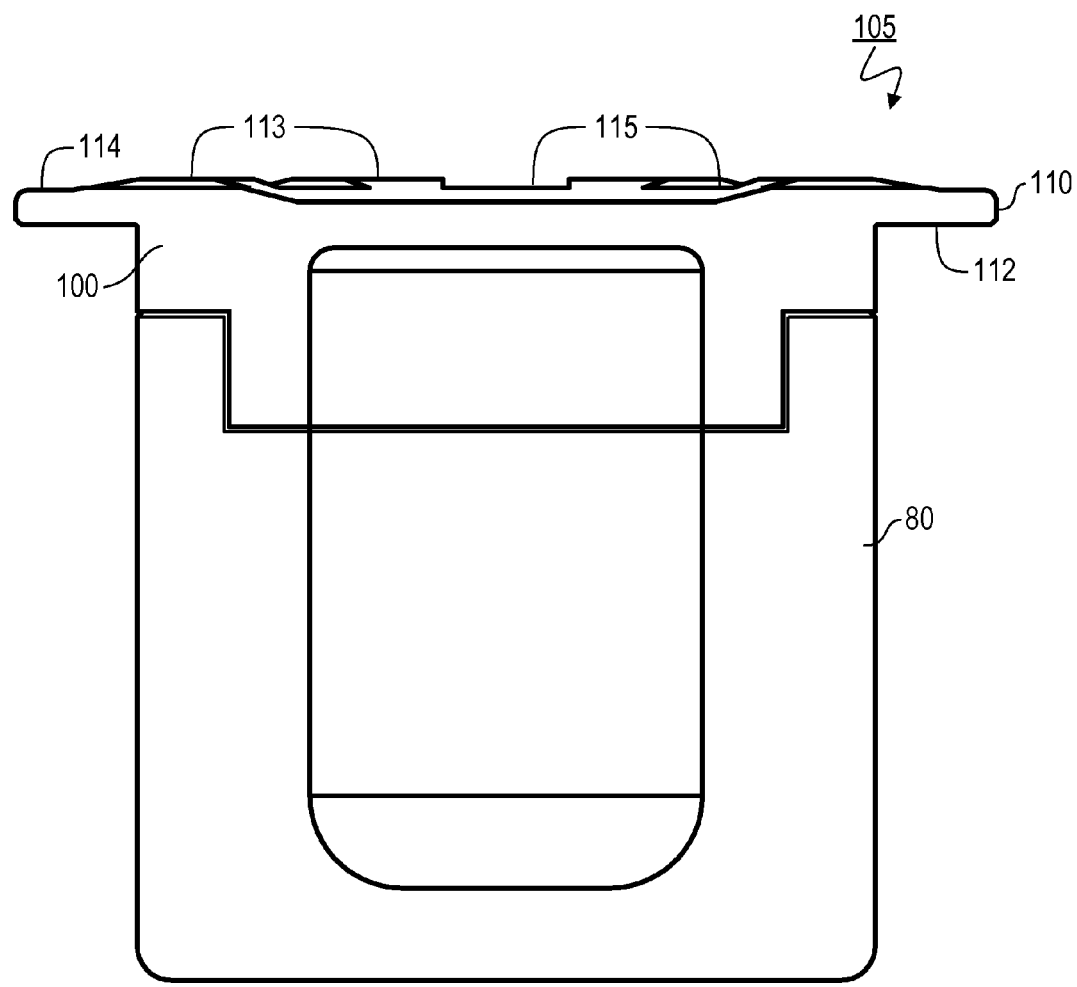
FIG. 7 is a sectional view of a piston according to a first representative embodiment of the present invention.

A piston nose according to the preferred embodiments of the present invention includes a wider top portion as compared to conventional noses. The basic configuration of a piston body 80 with attached nose 100 (together forming the entire piston 105) is illustrated in FIG. 7. In the preferred embodiments, the piston body 80 is made of aluminum and the nose 100 is made of titanium (for the purpose of reducing thermal conduction). However, other materials instead may be used, e.g., other materials having low thermal conductance for piston nose 100.

As shown, the top portion 110 of nose 100 is wider than the piston body 80, resulting in additional shielding of thermal radiation. In the preferred embodiments, top portion 110 is as wide as possible, given other practical considerations, in order to provide the maximum amount of shielding. In certain embodiments, top portion 110 extends a distance 112 of at least 1-2 mm (millimeters) beyond the outer edge of piston body 80 and, in some embodiments, at least 4-6 mm beyond the outer edge of piston body 80. In other embodiments, it extends an average of at least 1-2 mm (millimeters), or an average of at least 4-6 mm, beyond the outer edge of piston body 80.

At the same time, in the preferred embodiments a relatively small portion 113 of the top surface 114 of nose 100 is slightly raised, relative to the rest 115 of top surface 114, so that only that raised portion 113 makes contact with the backing plate of the brake pad. The main advantage of this structure is that a heat shield (the wider top surface 114) is provided while minimizing the surface area that is required to contact the backing plate of the brake pad (thereby minimizing the direct thermal conductance to the piston). An additional benefit is that the resulting air pockets and regions of air circulation between the brake pad and the lower portions 115 of the top surface 114 further reduce thermal conductivity. More preferably, as discussed in greater detail below, the raised portion 113 consists of a ring of uniformly sized and uniformly angularly spaced elevated (or raised) areas, separated by uniformly sized and uniformly angularly spaced gaps.

Figure 8:
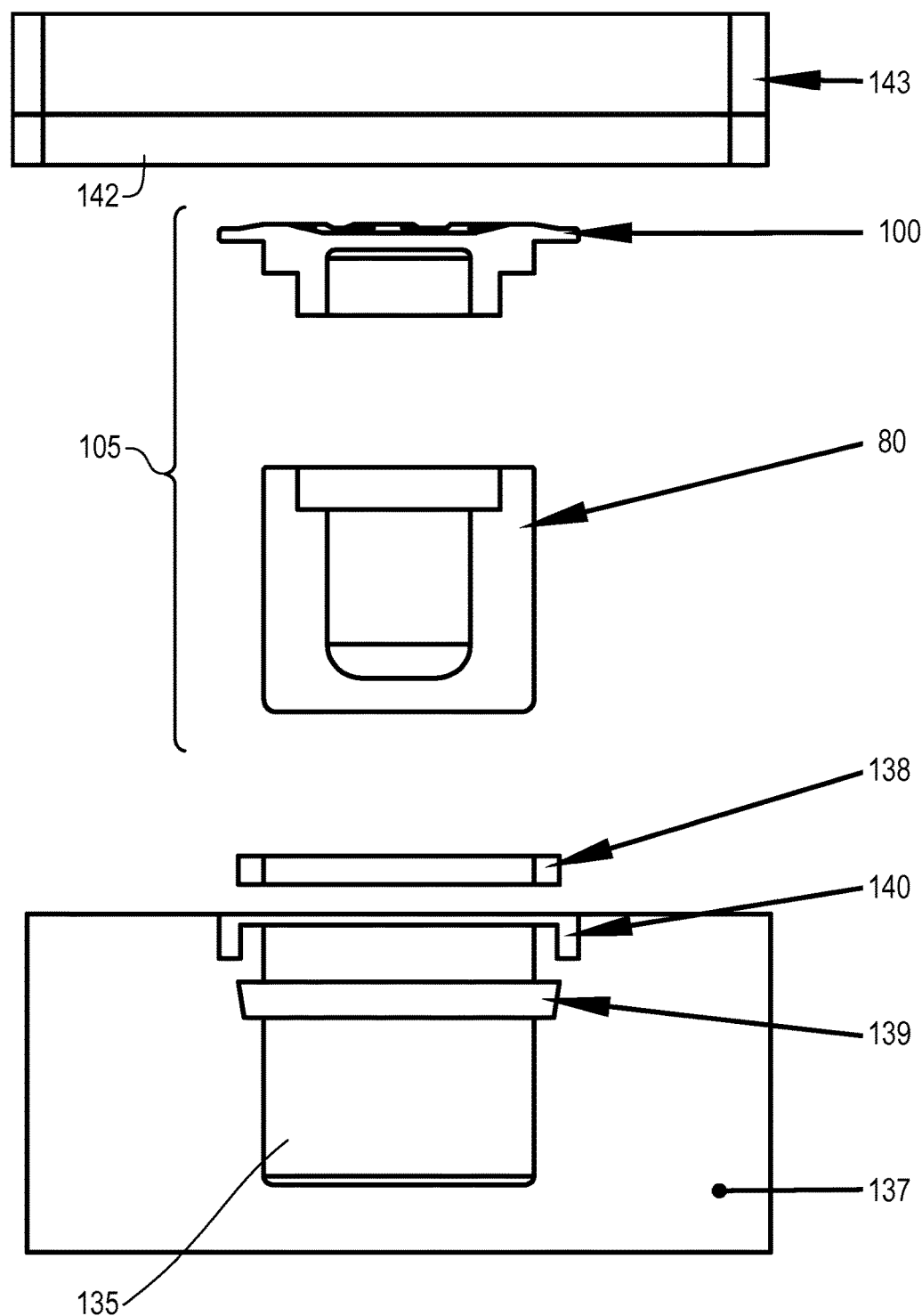
FIG. 8 is an exploded sectional view of a caliper assembly and brake pad according to the first representative embodiment of the present invention.

In the preferred embodiments of the invention, nose 100 is manufactured as a separate component by cutting a disc of titanium, e.g., using a lathe and/or a cross-cutter, to produce the desired configuration. More preferably, raised portions 113 are formed by cutting away metal (e.g., above lower portions 115) so as to leave raised portions 113. Once finished, nose 100 can be used to produce a complete brake caliper assembly in the manner shown in FIG. 8. Specifically, nose 100 is installed onto piston body 80, which is then inserted into a receiving cavity 135 within the caliper body 137 (after installing a high-pressure seal 138 into a corresponding circular groove 139 and an optional dust boot into optional dust boot groove 140, also within the hydraulic piston cavity 135). Finally, piston nose 100 is positioned so as to abut the backing plate 142 of the brake pad 143. In operation, pressurized hydraulic brake fluid in the cavity 135 (connected to a fluid reservoir by a line not shown in the drawings) forces the piston 105 against the brake pad 143 which, in turn, presses against a brake disc (not shown), slowing down its rotational motion through friction (which produces the above-referenced heat buildup).

Figure 9:
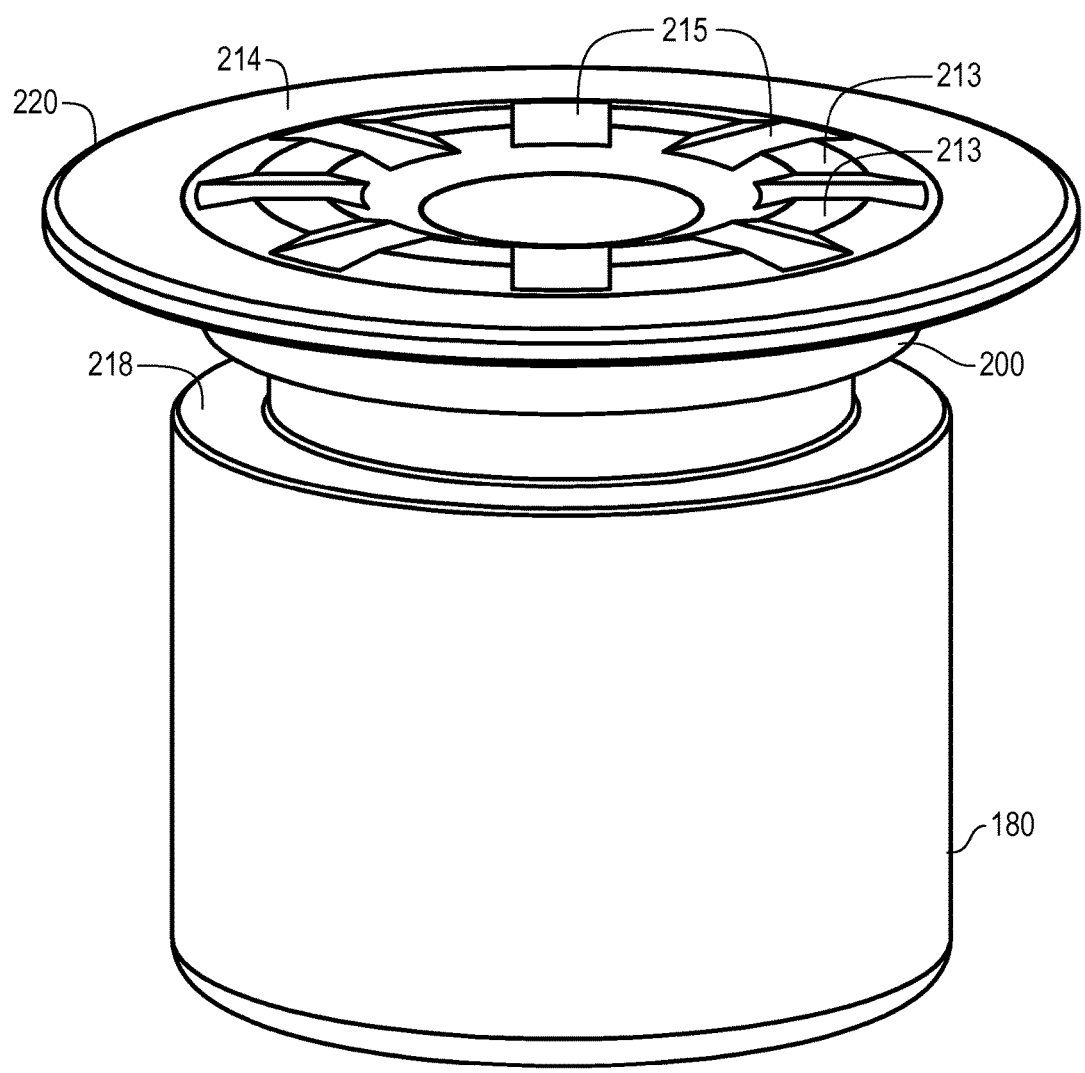
FIG. 9 is a perspective view of a piston according to a second representative embodiment of the present invention.
Figure 10:
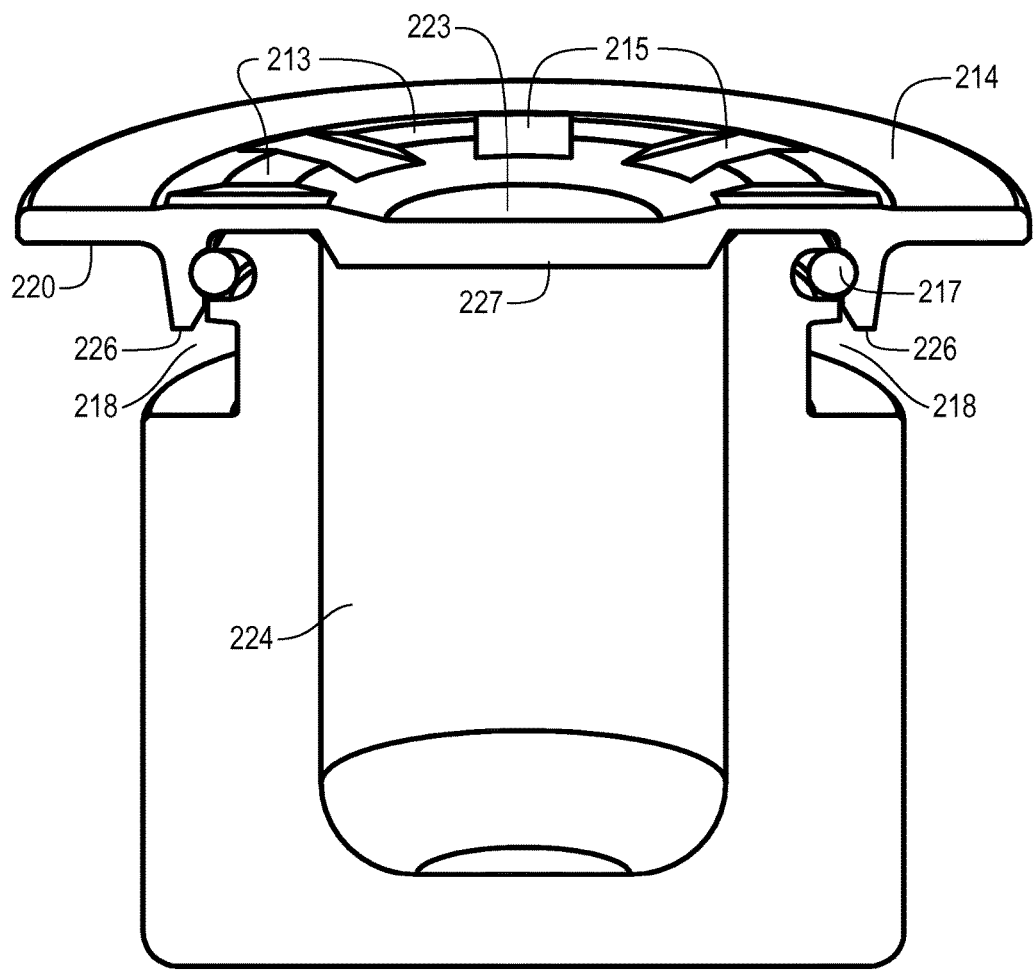
FIG. 10 is a cutaway view of the piston according to the second representative embodiment.
Figure 11:
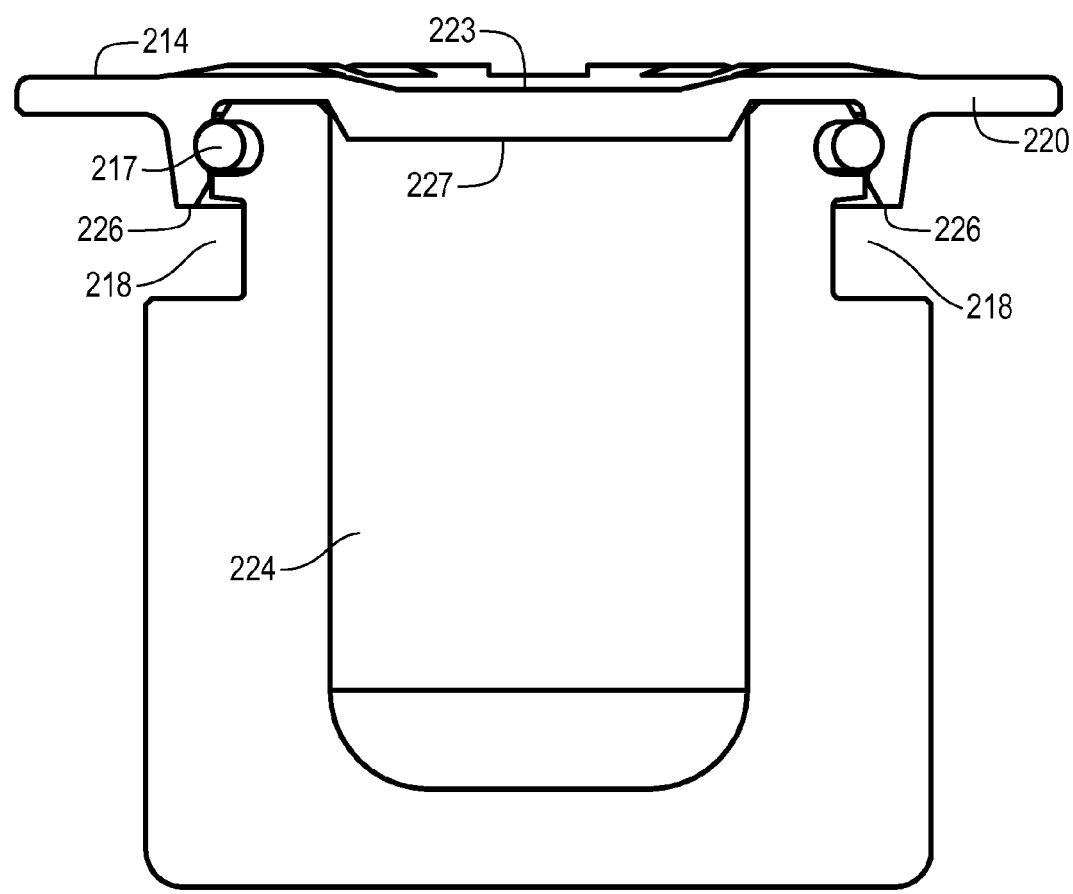
FIG. 11 is a sectional view of the piston according to the second representative embodiment.

FIGS. 9-11 illustrate a piston body 180 and attached nose 200 according to a more-specific embodiment of the present invention. FIGS. 9 and 10 more clearly illustrate a ring of raised areas 213 separated by gaps 215, as mentioned above. In the present embodiment, there are eight such raised areas 213 separated by eight such gaps 215. However, any other number instead may be used. As shown in the drawings, the outer edge of this ring preferably at least approximately corresponds to the outer edge of piston body 180, and the inner edge of the ring at least approximately corresponds to the inner surface of piston body 180 (which defines the hollow core 224). More specifically, in this particular embodiment only raised areas 213 are higher than the rest of the top surface 214 of nose 200, thereby resulting in a layer of air above such rest of the top surface 214 and facilitating movement of such air. In the current embodiment, raised areas 213 are approximately 1 mm higher than the rest of the top surface 214. Even greater elevation distances can provide even further reduce thermal conductance; however, doing so also increases the overall length of the resulting piston and, because space is at a premium in high performance vehicles, it generally is desirable to keep the overall caliper assembly as small as possible. Preferably subject to these considerations, raised areas 213 can be any desired amount higher than the rest (or the surrounding portions of) top surface 214, e.g., any height within the range of 0.5-7.0 mm or any height that is at least 1-6 mm. As also shown in the drawings, a secondary surface 223 also can be provided at a lower level than (indented from) the top surface 214 (e.g., above core 224), thereby providing even greater thermal isolation within that region.

Also in this embodiment, nose 200 is securely attached to piston body 180 through the use of a snap ring 217, and the piston body 180 includes a groove 218 for seating a dust boot 222. In alternate embodiments, nose 200 can be attached to piston body 180 in any of a variety of other ways. Similarly, in alternate embodiments, groove 218 and the corresponding dust boot 222 (shown in FIGS. 12 and 13) can be omitted.

Similar to the other embodiments discussed herein, piston body 180 has a hollow core 224 Piston nose 200 includes a fairly shallow ridge 226 (circular in the present embodiment) for fitting over the top (or distal) end of piston body 180 and a central portion 227 that extends somewhat into the core 224 of the piston body 180. However, in alternate embodiments other means are employed for attaching piston nose 200 to piston body 180. For instance, ridge 226 instead can be made to have a smaller diameter so that it fits within the inner wall of hollow core 224.

Figure 12:
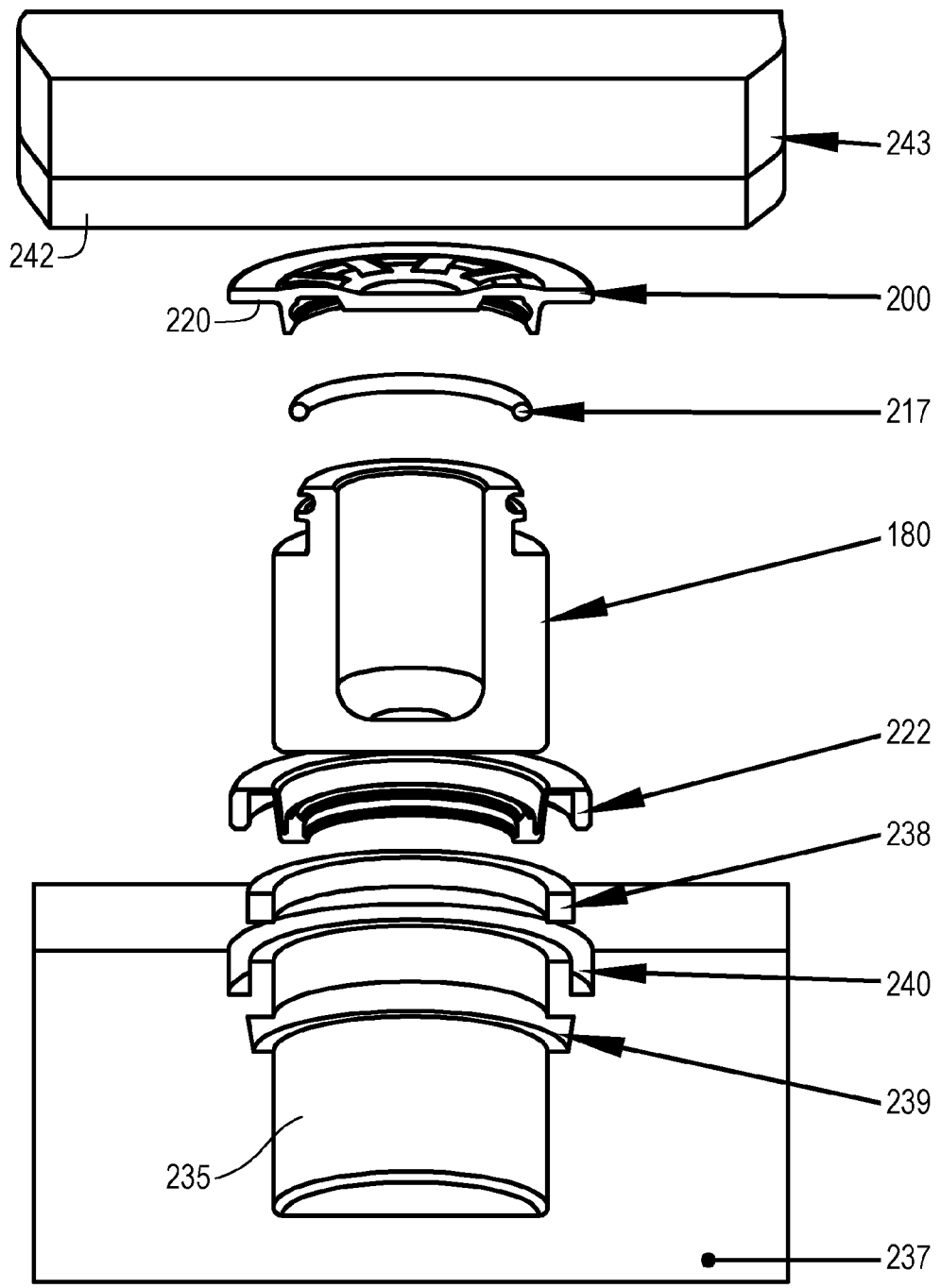
FIG. 12 is an exploded cutaway view of a caliper assembly and brake pad according to the second representative embodiment of the present invention
Figure 13:
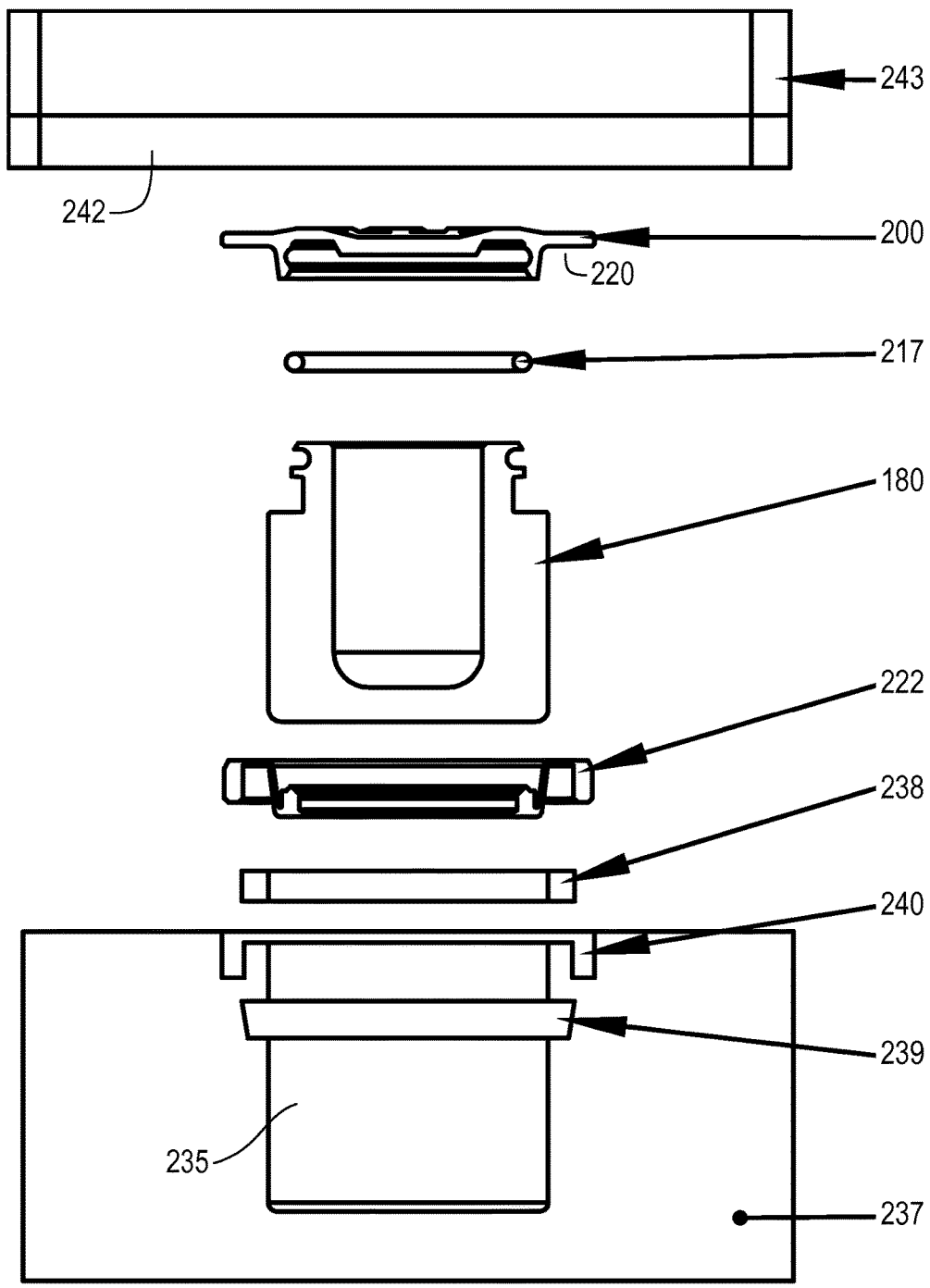
FIG. 13 is an exploded sectional view of a caliper assembly and brake pad according to the second representative embodiment of the present invention.

FIGS. 12 and 13 illustrate a brake pad 230 and the components of the foregoing caliper assembly in an exploded fashion. As can be seen in these drawings, the wider top portion 220 of nose 200 preferably is at least as wide as the dust boot 222, thereby protecting it from thermal radiation. More preferably, this margin is as large as practically possible, e.g., at least 1-2 mm at each position around the circumference or an average of at least 1-2 mm around the circumference. In FIGS. 12 and 13, caliper components 235 and 237-240 correspond to components 135 and 137-140 (discussed above), respectively.

Figure 14:
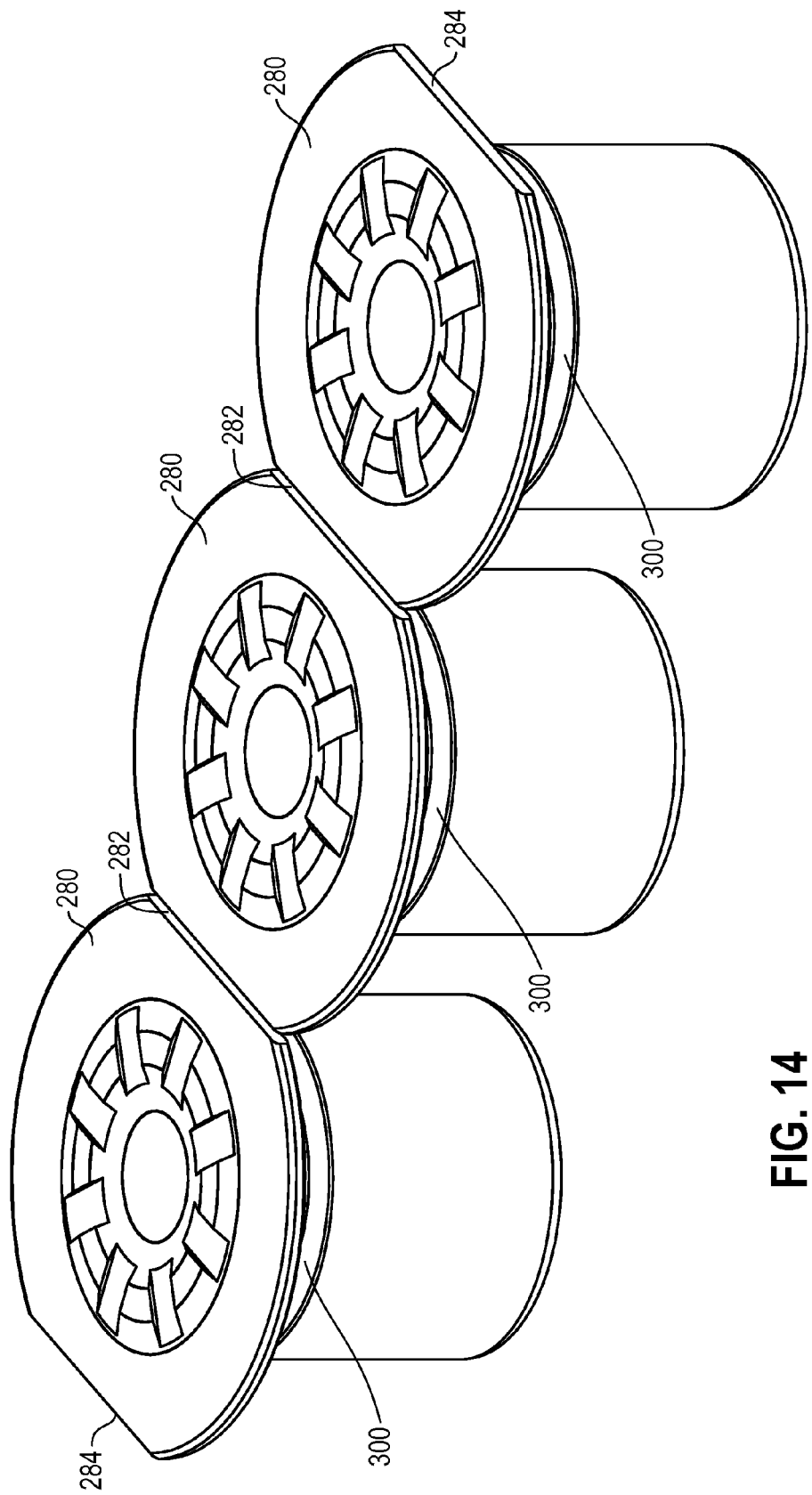
FIG. 14 is a perspective view of three adjacent pistons, used in a single caliper assembly, according to a third representative embodiment of the present invention.

In the embodiments described above, the top portion (e.g., 110 or 220) of the nose is circular in shape. However, in alternate embodiments other shapes may be used and sometimes are desirable. For instance, many conventional high-performance calipers include multiple pistons. In this situation, the nose configuration described above preferably is modified, e.g., as shown in FIG. 14, to maximize the aggregate shielding effect. As can be seen in FIG. 14, the top portions 280 of noses 300 are straight (or at least approximately straight along the sides 282 where they are adjacent to each other, but are otherwise round (or at least rounded). The gaps between adjacent noses 300 (along the sides 282) preferably are approximately 0.05-0.1 mm wide. Although it is possible to also round the outer ends 284, making them straight as well permits the manufacture of a single nose configuration.

Still further, it would be possible to manufacture a single compound component for use with multiple pistons (e.g., effectively joining the function of the noses 300 illustrated in FIG. 14 along the edges 282). One example of such an embodiment would be to attach (e.g., by welding) a plurality of ring-shaped contact elements to a sheet of titanium, where the ring-shaped contact elements align with the pistons (e.g., their central axes align) when the component is installed between the pistons and the backing plate of the brake pad (e.g., and when held in position in the same manner as the brake pad). In this way, the same offset of the titanium heat shield is achieved as in the embodiments described above. Such an embodiment can be considered a "nose" in the broad sense of that term (i.e., although the nose is not fixedly attached to the piston in this embodiment).

Figure 1:
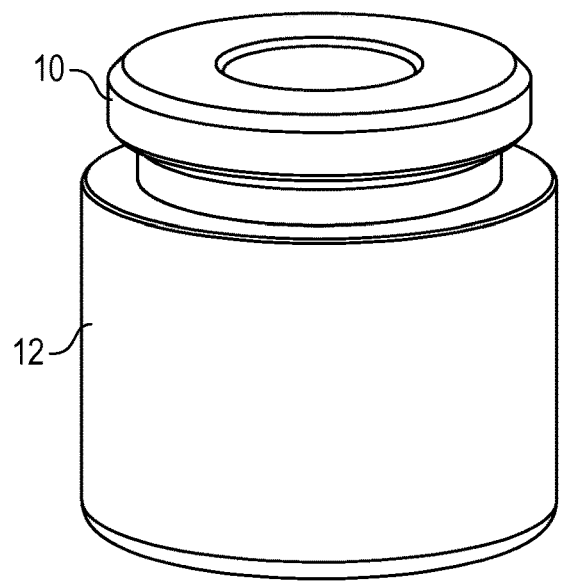
FIG. 1 is a perspective view of a first conventional piston.
Figure 2:
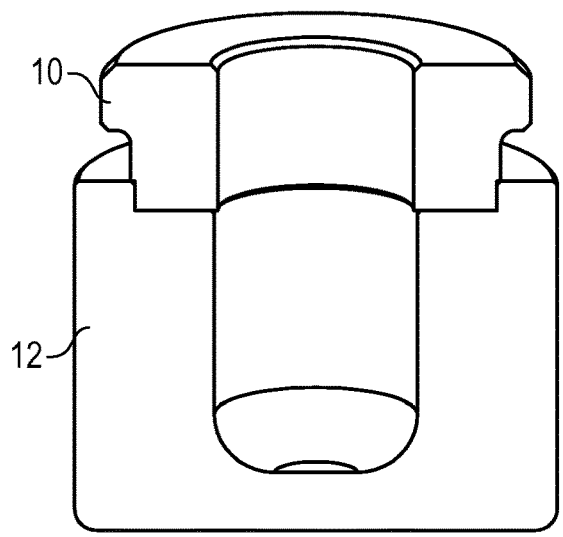
FIG. 2 is a cutaway view of the first conventional piston.
Figure 3:
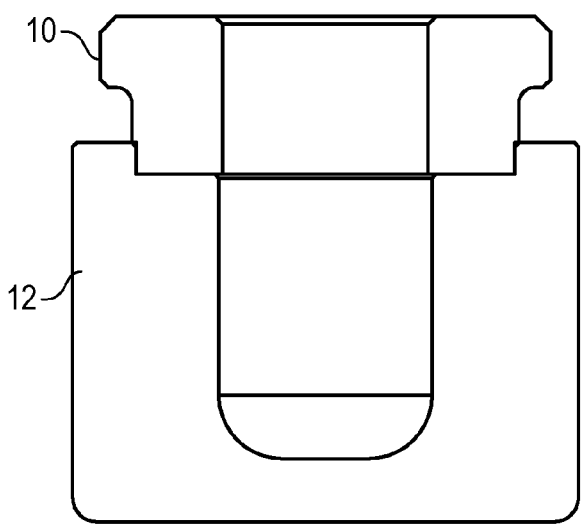
FIG. 3 is a sectional view of the first conventional piston.
Figure 4:
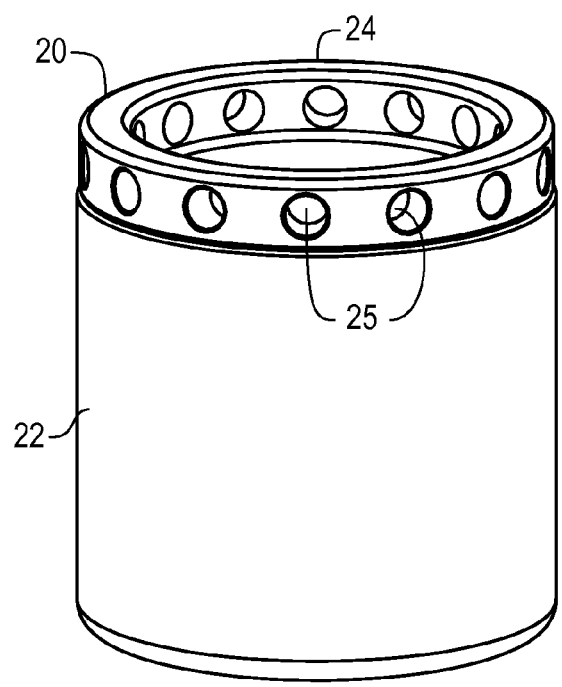
FIG. 4 is a perspective view of a second conventional piston.
Figure 5:
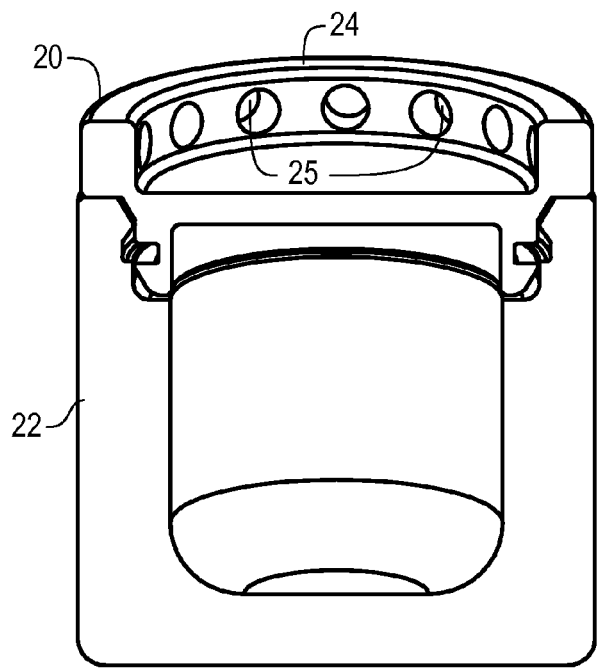
FIG. 5 is a cutaway view of the second conventional piston.
Figure 6:
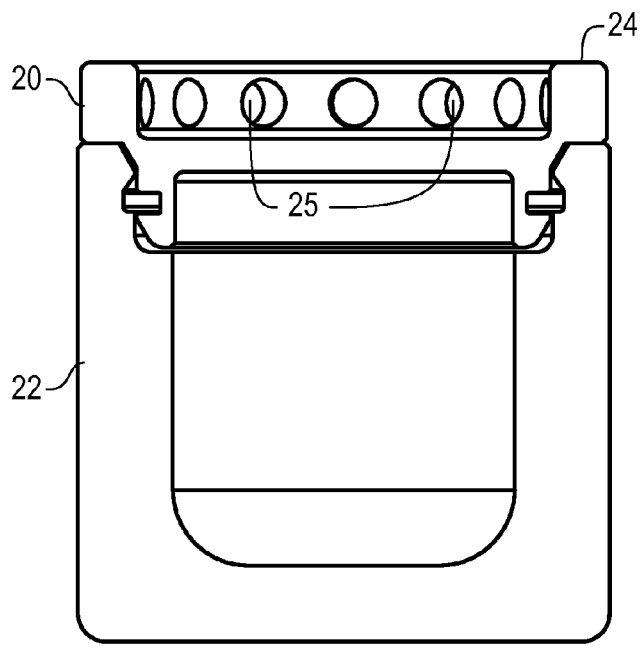
FIG. 6 is a sectional view of the second conventional piston.

The nominal thickness of the top portion 110 or 220 of the nose according to the preferred embodiments is approximately 0.5-1.0 mm and, as noted above, the raised sections 113 or 213 preferably extend an additional 1 mm above that. As a result, the total additional length provided by a piston nose according to the preferred embodiments can be approximately 2 mm, or even less. This is substantially less than the additional length provided by a conventional nose (such as the piston nose 20 illustrated in FIGS. 4-6) which, as noted above, can be 5 or 8 mm. At the same time, the present inventors have discovered that a piston nose according to the present invention generally can significantly reduce the amount of heat that is transferred to the piston from the brake pad. Finally, a piston nose according to the present invention typically is much faster and easier to manufacture than a conventional piston nose. For instance, unlike the conventional nose 20 illustrated in FIGS. 4-6, a piston nose according to the present invention does not require any drilling of holes and often requires significantly less lathing.

It is noted that a brake piston according to the present invention can be utilized in an automotive braking system and is particularly useful in high-performance braking systems. In addition, it can be used in other high-performance applications, such as for slowing a helicopter rotor.

Additional Considerations.

In the event of any conflict or inconsistency between the disclosure explicitly set forth herein or in the attached drawings, on the one hand, and any materials incorporated by reference herein, on the other, the present disclosure shall take precedence. In the event of any conflict or inconsistency between the disclosures of any applications or patents incorporated by reference herein, the more recently filed disclosure shall take precedence.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A brake piston, comprising:
   a piston body; and
   a top surface that is wider than the piston body and that has a portion that is raised, relative to the rest of the top surface, so that when in use only the raised portion makes contact with a backing plate of a brake pad,
   wherein the raised portion is comprised of a ring of angularly spaced raised areas separated by gaps,
   wherein the raised portion is at least 1 millimeter higher than the rest of the top surface, and
   wherein an angular width of the gaps is greater than an angular width of the raised areas.

2. A brake piston according to claim 1, wherein the top surface extends a distance of at least 1 millimeter beyond an outer edge of the piston body at each position around a circumference of the piston body.

3. A brake piston according to claim 1, wherein the top surface extends a distance of at least 2 millimeters beyond an outer edge of piston body at each position around a circumference of the piston body.

4. A brake piston according to claim 1, wherein the top surface provides shielding of thermal radiation.

5. A brake piston according to claim 1, wherein the raised areas within the ring are uniformly sized and uniformly angularly spaced.

6. A brake piston according to claim 1, wherein an outer edge of the ring at least approximately corresponds to an outer edge of the piston body.

7. A brake piston according to claim 5, wherein the gaps are uniformly sized and uniformly angularly spaced.

8. A brake piston according to claim 5, wherein only said uniformly sized and uniformly angularly spaced raised areas are higher than the rest of the top surface.

9. A brake piston according to claim 1, wherein the top surface is provided by a separate piston nose component that is installed on top of the piston body.

10. A brake piston according to claim 9, wherein the piston body is made of aluminum and the piston nose component is made of titanium.

11. A brake piston according to claim 9, wherein the piston nose component is attached to the piston body through the use of a snap ring.

12. A brake piston according to claim 9, wherein the piston nose component is made of titanium and has been formed by cutting using at least one of a lathe and a cross-cutter.

13. A brake piston according to claim 1, wherein the raised areas are approximately 1 millimeter higher than the rest of the top surface.

14. A brake piston according to claim 1, wherein the raised areas are at least 2 millimeters higher than the rest of the top surface.

15. A brake piston according to claim 1, wherein an edge of the top surface is straight along two opposite sides and is otherwise rounded.

16. A brake piston according to claim 1, wherein a portion of the top surface extending beyond the piston body is approximately 0.5-1.0 millimeter thick.

17. A brake piston according to claim 1, further comprising a dust boot attached to the piston body, and wherein the top surface width is at least as wide as the dust boot.

18. A brake piston according to claim 1, wherein the piston body defines a hollow core, and further comprising a secondary surface that is disposed above the hollow core and that is provided at a lower level than, and indented from, the top surface.

19. A brake piston according to claim 1, wherein only the raised areas within said ring are higher than the rest of the top surface.

20. A brake piston according to claim 1, wherein the angular width of the gaps is greater than the angular width of the raised areas along an inner edge of the ring.

21. A brake piston according to claim 6, wherein the piston body defines a hollow core having an inner surface, and an inner edge of the ring at least approximately corresponds to the inner surface of the piston body.

22. A brake piston according to claim 21, wherein the top surface extends a distance of at least 1 mm (millimeter) beyond the outer edge of the piston body and, therefore, extends beyond the outer edge of the ring.

23. A disc brake caliper assembly, comprising:
a caliper body having a receiving cavity; and
a piston inserted into the receiving cavity of the caliper body,
wherein the piston includes: (a) a piston body; and (b) a top surface that is wider than the piston body and that has a portion that is raised, relative to the rest of the top surface, so that when in use only the raised portion makes contact with a backing plate of a brake pad, and
wherein the raised portion is comprised of a ring of angularly spaced raised areas separated by gaps,
wherein the raised portion is at least 1 millimeter higher than the rest of the top surface, and
wherein an angular width of the gaps is greater than an angular width of the raised areas.

24. A piston nose, comprising:
a bottom side configured to attach to a top side of a piston; and
a top side that is substantially wider than the bottom side and that includes a top surface that has a portion that is raised relative to the rest of the top surface,
wherein the raised portion is comprised of a ring of angularly spaced raised areas separated by gaps,
wherein the raised portion is at least 1 millimeter higher than the rest of the top surface, and
wherein an angular width of the gaps is greater than an angular width of the raised areas.

* * * * *